US008660525B2

(12) United States Patent
Walter et al.

(10) Patent No.: US 8,660,525 B2
(45) Date of Patent: *Feb. 25, 2014

(54) METHOD FOR SEGREGATING BILLABLE TRANSACTIONS IN A MULTIMODE COMMUNICATION DEVICE

(71) Applicant: AT&T Intellectual Property I, LP, Atlanta, GA (US)

(72) Inventors: Edward Walter, Boerne, TX (US); Terry Hect, San Antonio, TX (US)

(73) Assignee: AT&T Intellectual Property I, LP, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/938,729

(22) Filed: Jul. 10, 2013

(65) Prior Publication Data

US 2013/0303116 A1  Nov. 14, 2013

Related U.S. Application Data

(63) Continuation of application No. 11/296,954, filed on Dec. 8, 2005, now Pat. No. 8,515,387.

(51) Int. Cl.
*H04M 11/00* (2006.01)

(52) U.S. Cl.
USPC .. 455/408; 455/415; 379/114.03; 379/121.03

(58) Field of Classification Search
None
See application file for complete search history.

(56) References Cited

U.S. PATENT DOCUMENTS

| | | |
|---|---|---|
| 6,282,274 B1 | 8/2001 | Jain |
| 6,757,371 B2 | 6/2004 | Kim |
| 6,925,160 B1 | 8/2005 | Stevens |
| 7,171,236 B2 | 1/2007 | Heo |
| 7,174,164 B1 | 2/2007 | Knoop |
| 2001/0019943 A1 | 9/2001 | Bender |
| 2002/0042715 A1 | 4/2002 | Kelley |
| 2004/0203579 A1 | 10/2004 | Comp |
| 2004/0210524 A1 | 10/2004 | Benenati |
| 2004/0235455 A1 | 11/2004 | Jiang |
| 2004/0259525 A1 | 12/2004 | Kotzin |
| 2005/0013422 A1 | 1/2005 | Wardin |
| 2005/0107122 A1 | 5/2005 | Van Reenen |
| 2005/0207557 A1 | 9/2005 | Dolan |
| 2006/0084469 A1 | 4/2006 | Malone |
| 2009/0149154 A1 | 6/2009 | Bhasin et al. |

FOREIGN PATENT DOCUMENTS

WO  02073992  9/2002

*Primary Examiner* — German J Viana Di Prisco
(74) *Attorney, Agent, or Firm* — Guntin & Gust, PLC; Andrew Gust

(57) ABSTRACT

A system and method are disclosed for segregating transactions in a multimode communication device. A system that incorporates teachings of the present disclosure may include, for example, a communication device (102) has a controller (206) for managing operations of a wireless transceiver (202) that supports a plurality of access technologies. The controller can be programmed to update (301) a phonebook stored in the communication device, wherein each entry in the phonebook comprises a calling number and one among a plurality of account designations, and submit (344) the phonebook to a network management system (110) for segregating (514) billing of incoming and outgoing calls directed to and from the communication device on each of the access technologies according to a corresponding account designation retrieved (510) from the phonebook according to said calls.

20 Claims, 5 Drawing Sheets

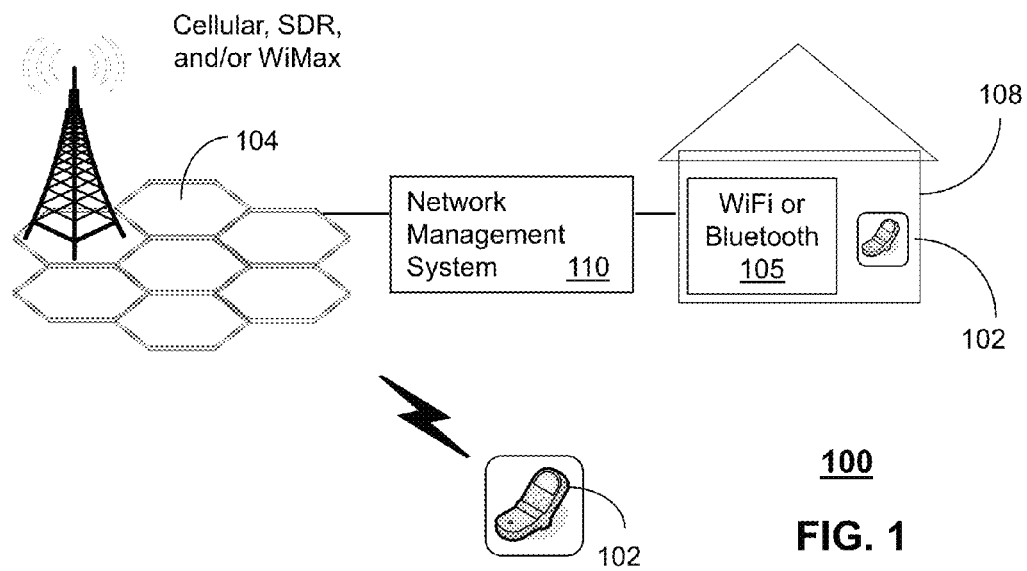
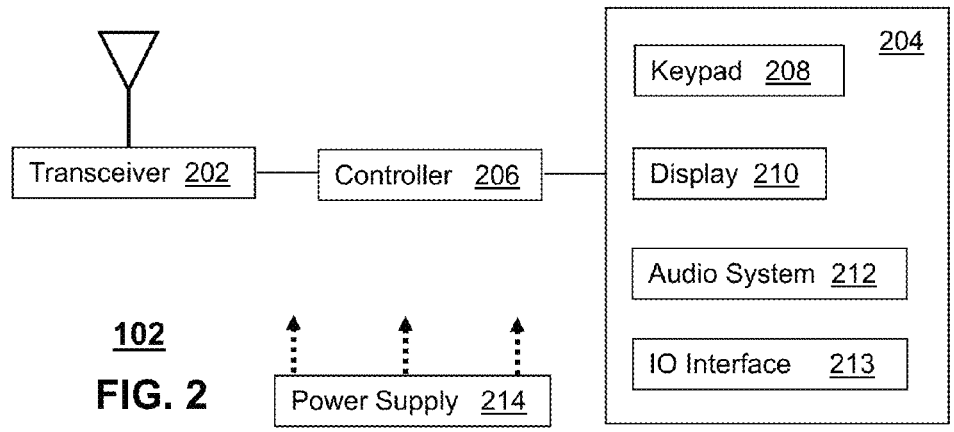

600

METHOD FOR SEGREGATING BILLABLE TRANSACTIONS IN A MULTIMODE COMMUNICATION DEVICE

CROSS-REFERENCE TO RELATED APPLICATIONS

This application is a continuation of U.S. patent application Ser. No. 11/296,954 filed Dec. 8, 2005 which is incorporated herein by reference in its entirety.

U.S. patent application, filed on Dec. 8, 2005, by Grannan, entitled "Method for Scanning Services with a Multimode Communication Device," incorporated herein by reference.

FIELD OF THE DISCLOSURE

The present disclosure relates generally to multimode communication devices, and more specifically to a method for segregating billable transactions in a multimode communication device.

BACKGROUND

The FCC's (Federal Communications Commission) experience with unlicensed bands has proven that providing a "commons" area for spectrum has fostered lots of new consumer devices and services. To spur further advancements in the communications industry the FCC has recently proposed that unused TV spectrum resulting from the transition to HDTV (High Definition TV) be made available to consumer devices and communication service providers on a dynamic basis.

With a wider range of available licensed and unlicensed spectrum, mobile communication devices are expected to support in the near future multiple access technologies such as cellular, Bluetooth™, WiFi, WiMAX, ultra wideband (UWB), and the ultimate evolution to Software Defined Radio (SDR) technology. It is also expected that each of these access technologies will produce a number of billable services offered to consumers of multimode communication devices.

A need therefore arises for segregating billable transactions in a multimode communication device.

BRIEF DESCRIPTION OF THE DRAWINGS

FIG. 1 depicts an exemplary embodiment of a communication device and a network management system (NMS) operating in a communication system;

FIG. 2 depicts an exemplary embodiment of the communication device;

DETAILED DESCRIPTION

Figure 3:
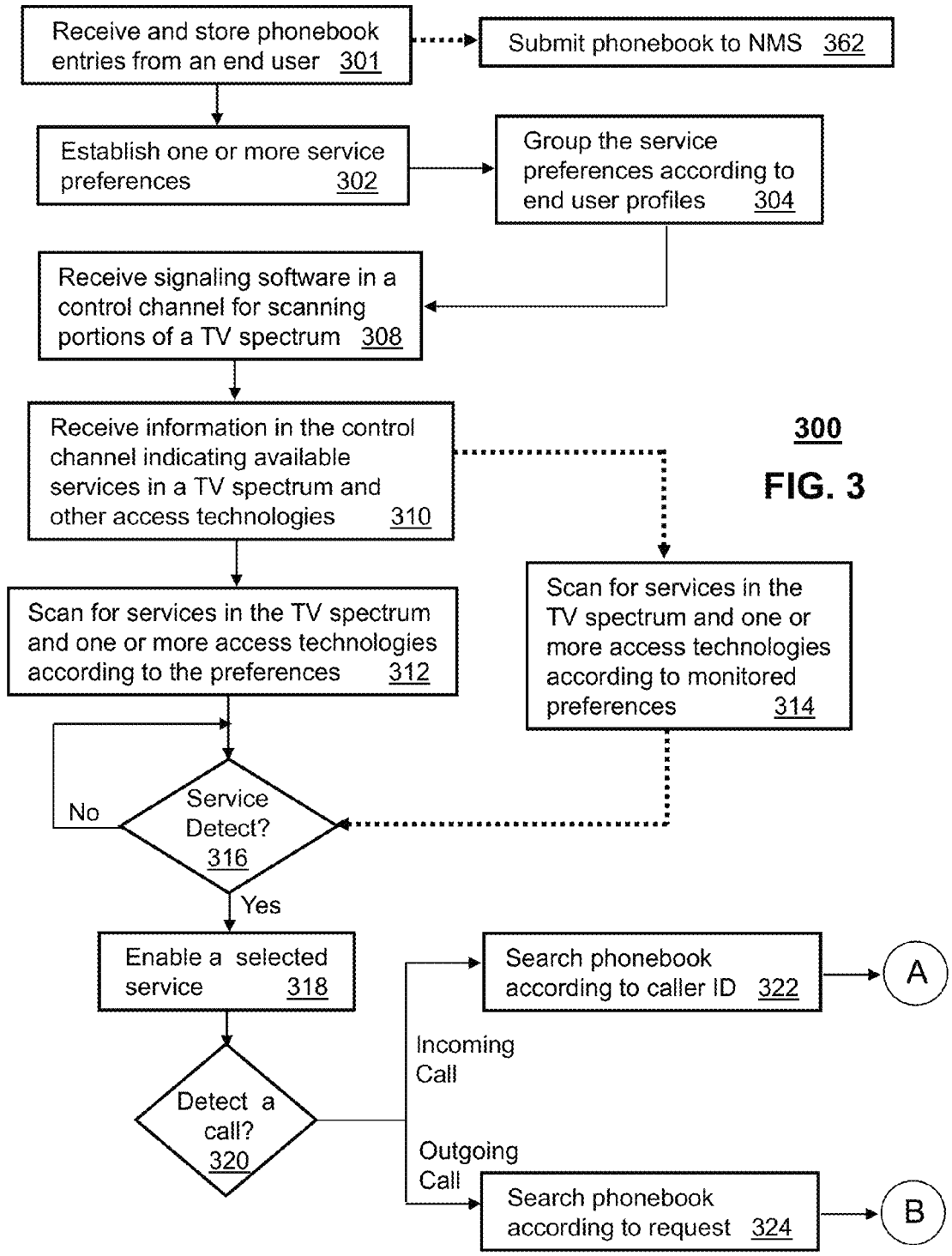
FIGS. 3-5 depict an exemplary method operating in the communication device.

Embodiments in accordance with the present disclosure provide a method for segregating transactions in a multimode communication device.

In a first embodiment of the present disclosure, a computer-readable storage medium operates in a communication device. The storage medium can include computer instructions for storing a phonebook, wherein each entry in the phonebook comprises a calling number and one among a plurality of account designations. Upon detecting an incoming call with a caller ID on one of a plurality of access technologies, the storage medium has computer instructions for searching the phonebook according to the caller ID. If a match is detected between the caller ID and an entry in the phonebook, the storage medium further includes computer instructions for accepting the incoming call, and submitting to a network management system (NMS) an account designation corresponding to the matched phonebook entry for selective billing of the incoming call.

In a second embodiment of the present disclosure, a communication device has a controller for managing operations of a wireless transceiver that supports a plurality of access technologies. The controller can be programmed to update a phonebook stored in the communication device, wherein each entry in the phonebook comprises a calling number and one among a plurality of account designations, and submit the phonebook to a network management system for segregating billing of incoming calls directed to and from the communication device on each of the access technologies according to a corresponding account designation retrieved from the phonebook according to said calls.

In a third embodiment of the present disclosure, a computer-readable storage medium operates in a network management system (NMS). The storage medium can have computer instructions for detecting one among an incoming call having a caller ID directed to a communication device and a request for an outgoing call from the communication device on one among a plurality of access technologies. For the incoming call, the storage medium can have computer instructions for searching a phonebook associated with the communication device according to the caller ID, wherein each entry in the phonebook comprises a calling number and one among a plurality of account designations. If a match is detected between the caller ID and an entry in the phonebook, the storage medium can have computer instructions for billing the incoming call once accepted by the communication device according to an account designation corresponding to the matched phonebook entry. For the outgoing call, the storage medium can have computer instructions for searching the phonebook according to the request for the outgoing call. If a match is detected between the request and an entry in the phonebook, the storage medium can have computer instructions for billing the outgoing call once initiated according to an account designation corresponding to the matched phonebook entry.

In a fourth embodiment of the present disclosure, a computer-readable storage medium operates in an NMS. The storage medium can have computer instructions for detecting one among an incoming call having a caller ID directed to a communication device and a request for an outgoing call from the communication device on one among a plurality of access technologies. For the incoming call, the storage medium can have computer instructions for receiving from the communication device an account designation if the communication device detects a match between an entry in its phonebook and the caller ID. The storage medium can have computer instructions for billing the incoming call once accepted by the communication device according to the account designation. For the outgoing call, the storage medium can have computer instructions for receiving from the communication device an account designation if the communication device detects a match between an entry in its phonebook and the request for the outgoing call. The storage medium can further have computer instructions for billing the outgoing call once initiated according to the account designation.

FIG. 1 depicts an exemplary embodiment of a communication device 102 and a network management system (NMS) 110 operating in a communication system 100. The NMS 110 can be programmed to manage billing of transactions (e.g., incoming and outgoing calls) taking place between the communication device 102 and the multiple access technologies shown in FIG. 1. The communication device 102 in the present illustration represents a multimode communication device capable of communicating with any number of access technologies operating in a base station 104 such as, for example, cellular, software defined radio (SDR), ultra wideband (UWB), and/or WiMAX technologies, just to mention a few. Cellular technologies can include, for example, CDMA-1X, UMTS/HSDPA, GSM/GPRS, TDMA/EDGE, EV/DO, and next generation technologies as they arise. Alternatively, or in combination, the communication device 102 and the base station 104 can also support WiMAX broadband communications operating at 2.3 GHz, 2.5 GHz, 3.5 GHz, or 5.8 GHz frequencies.

The communication device 102 and the base station 104 can also be programmed to perform spectrum analysis utilizing SDR techniques to identify unused portions of spectrum in a local area. The unused spectrum can be represented by portions of TV spectrum expected to be released by the FCC for public use (e.g., 54-72 MHz, 76-88 MHz, 174-216 MHz, 470-806 MHz). Whether or not the FCC releases this spectrum for unlicensed use, has no impact on the operations of the communication device 102 and base station 104 as described herein. The communication device 102 can also be programmed to access WiFi and/or Bluetooth access points. The WiFi or Bluetooth access points can be located in a residence or commercial building 108.

FIG. 2 depicts an exemplary embodiment of the communication device 102. The communication device 104 can comprise a wireless transceiver 202, a user interface (UI) 204, a power supply 214, and a controller 206 for managing operations thereof. The wireless transceiver 202 utilizes common communication technology that supports at least two of the aforementioned access technologies (i.e., cellular, SDR, WiMAX, WiFi and Bluetooth). The UI 204 can include a depressible keypad 208 for manipulating operations of the communication device 102. The UI 204 can further include a display 210 such as a monochrome or color LCD (Liquid Crystal Display) for conveying images to the end user of the communication device 102. The audio system 212 of the UI 204 utilizes common audio technology for conveying and intercepting audible signals of the end user. The UI 204 can also include an IO (Input/Output) interface 213 utilizing common technology for over-the-air (Bluetooth™) or wired coupling to other computing devices. This interface can be used among other things for provisioning functions in the communication device 102.

The power supply 214 can utilize common power management technologies (such as replaceable batteries, supply regulation technologies, and charging system technologies) for supplying energy to the components of the communication device 102 to facilitate portable applications. The controller 206 can utilize computing technologies such as a microprocessor and/or digital signal processor (DSP) with associated storage memory such a Flash, ROM, RAM, SRAM, DRAM or other like technologies.

FIG. 3 depicts an exemplary method 300 operating in the communication device 102. Method 300 begins with step 301 with the controller 206 being programmed to receive and store phonebook entries from an end user of the communication device 102. Each phonebook entry includes a calling number and one among a plurality of account designations. The account designation can be used for segregating calls into billing categories (e.g., business account 1, business account 2, business account n, personal account, miscellaneous account).

The account designation can be identified by as many digits as needed for representing said categories. For example, a single digit ranging from 0 to 9 can be added to a 10 digit calling number to represent any of 10 categories for circuit-switched calls. In a digital implementation such as over an IP (Internet Protocol) interface utilizing SIP (Session Initiation Protocol) for flow control, the account designation can be represented with three binary bits to identify 8 possible categories. In either case, the aforementioned phonebook entries can be supplied by the end user by way of the keypad 208, or provisioning information supplied by a computing device (e.g., a laptop computer, or personal digital assistant or PDA) coupled to the IO interface 213.

In step 302 the controller 206 can be programmed to establish one or more service preferences for the end user of the communication device 102. The service preferences can include, for example, cost of service, quality of service (QoS), RF signal strength of a base station 104, communication range of the base station 104 relative to a location of the communication device 102, and hand-off capabilities of neighboring base stations 104. The controller 206 can in turn be programmed in step 304 to group these preferences under the direction of the end user into end user profiles such as a stationary end user profile, a mobile end user profile, an economic end user profile, and a data centric end user profile.

A stationary end user profile can be configured so that the communication device 102 seeks a network having an optimal balance between price and QoS. A mobile profile can configure the communication device 102 so that it seeks networks having the best signal strength, and secondarily the best hand-off capability between base stations 104. The economic end user profile can configure the communication device 102 so that it seeks a communication network having the lowest cost per bit independent of signal strength and range. The data centric end user profile can configure the communication device 102 so that it searches for networks having the highest ratio of Mbps to cost of service. The end user can obviously select other customized parameters for the aforementioned profiles and create other profiles of interest in steps 302-304.

In step 308, the controller 206 can also be programmed to receive signaling software in a control channel for scanning portions of the unlicensed TV spectrum. The signaling software controls the modulation and demodulation technique used for communicating in available bands of the TV spectrum as well as defines the communication protocol for exchanging messages with third party devices. The control channel can be supplied by a portion of the TV spectrum or any of the other access technologies (e.g., cellular). In accordance with SDR techniques, step 308 can be invoked any number of times to reprogram or update the controller 206 to enable a number of communication techniques utilized in the TV spectrum. Step 308 can also be applied to existing and future unlicensed frequencies made available by the FCC.

In step 310, the controller 206 can be programmed to receive information in the control channel indicating the available services in the TV spectrum (or other unlicensed frequency) as well as the other access technologies. This step can serve to accelerate the scanning process as well as inform the controller 206 of the type of signaling technique required to access services in the TV spectrum. The controller 206 can therefrom proceed to step 312 where it scans for the services identified in step 310 in the TV spectrum as well as the other access technologies according to the preferences set forth in steps 302-304. The foregoing services can represent, for example, full-duplex voice services (over circuit switched or packet switched networks using Voice over IP), half-duplex voice services, location services, video services, text messaging services, or instant messaging services, just to mention a few.

If one or more services are detected in step 316, the controller 206 proceeds to step 318; otherwise, it continues to monitor for services. In step 318, the controller 206 enables a service selected by the end user by way of the UI 204. For services having security protections, the end user may have to enter a security code such as a login and password.

Once the selected service has been enabled, the controller 206 proceeds to step 320 to monitor for incoming or outgoing voice calls. If an incoming call is detected, the controller 206 proceeds to step 322 where it searches for an entry in the phonebook according to a caller ID received with the incoming call. If an outgoing call is detected, the controller 206 proceeds to step 324 where it searches for an entry in the phonebook corresponding to a request from the end user supplied by way of, for example, a number of entries from the keypad 208. From steps 322 and 324, the controller 206 proceeds to steps 326 and 344, respectively.

In step 326, the controller 206 checks for a match between the caller ID of the incoming call and an entry in the phonebook. If an entry is found with a corresponding account designation, the controller 206 proceeds to step 328 where it enables communications between the calling party and the end user by way of the UI 204 upon the end user's acceptance of the call (e.g., opening a flip phone assembly or selecting the send button on the communication device 102). In step 330 the controller 206 proceeds to submit the account designation to the NMS 110. The NMS 110 in turn uses the account designation to segregate billing information as will be discussed shortly.

If, on the other hand, a match is not found, the controller 206 can proceed to one among steps 332 and 340. In step 332, the controller 206 can be programmed to request an alternate account designation from the end user. The request can be presented by way of a prompt in the display 210. In step 334, the end user can supply the alternate account designation by way of the keypad 208. In step 336, the controller 206 enables communications in response to the end user's acceptance of the call, and submits in step 338 the alternate account designation to the NMS 110. Alternatively, the controller 206 can proceed to step 340 where it enables communications in response to the end user's acceptance of the call, and in step 342 submits a default account designation to the NMS 110. An alternate account designation allows the end user to specify in real-time a billing category rather than automatically choosing a default account designation such as the miscellaneous account for all incoming calls with an unrecognized caller ID.

For outgoing calls, the controller 206 proceeds to step 344 where it checks for a match between the calling number and an entry in the phonebook. If a match is found, the controller 206 proceeds to step 346 where it initiates the call and in step 348 submits an account designation corresponding to the identified matched entry in the phonebook. Steps 346 and 348 can be contemporaneous, or sequential in any order.

If there is no match in the phonebook corresponding to the calling number of the outgoing call, the controller 206 can proceed to one of steps 350 and 358. In step 350, the controller 206 can request from the end user an alternate account designation similar to step 332. In step 352, the controller 206 receives from the end user the alternate account designation by way of the UI 204, and in steps 354-356 initiates the call and submits the alternate account designation to the NMS 110. Alternatively, the controller 206 can initiate the call in step 358, and submit a default account designation to the NMS 110.

Figure 4:
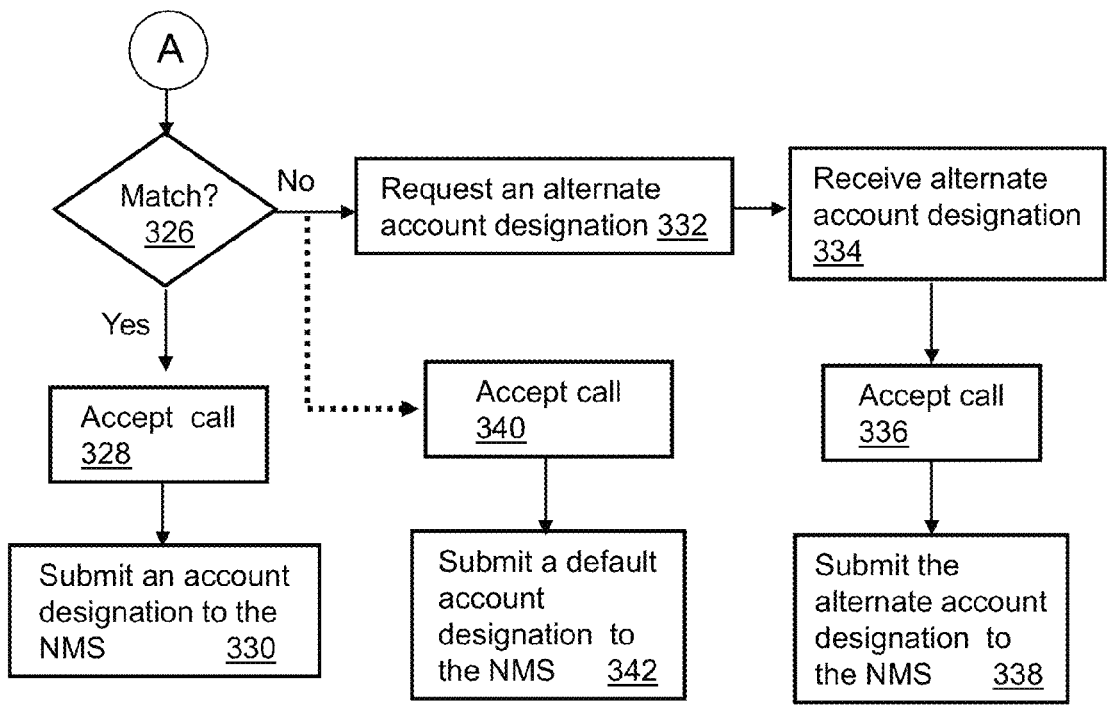
Figure 5:
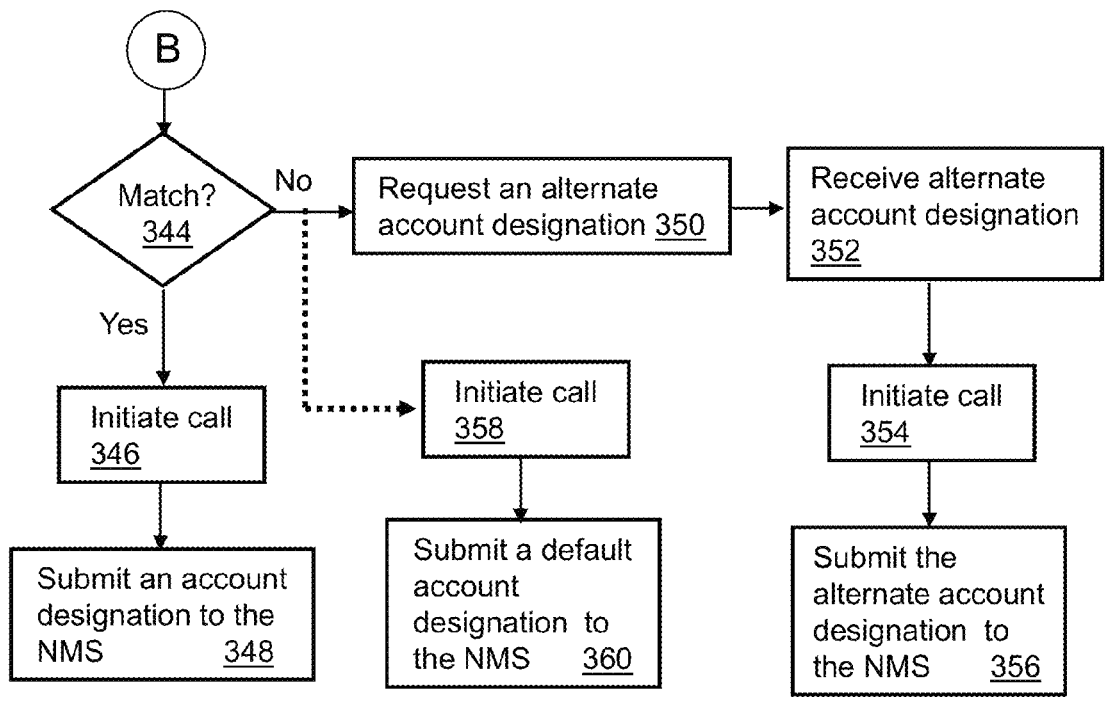

A number of the steps described in FIGS. 3-5 can alternatively be performed in the NMS 110. In this embodiment, the controller 206 can be programmed to submit its phonebook in step 362 to the NMS 110. The submission can be over a select one of the access technologies described above, or over an IP interface coupled to the IO interface 213.

Figure 6:
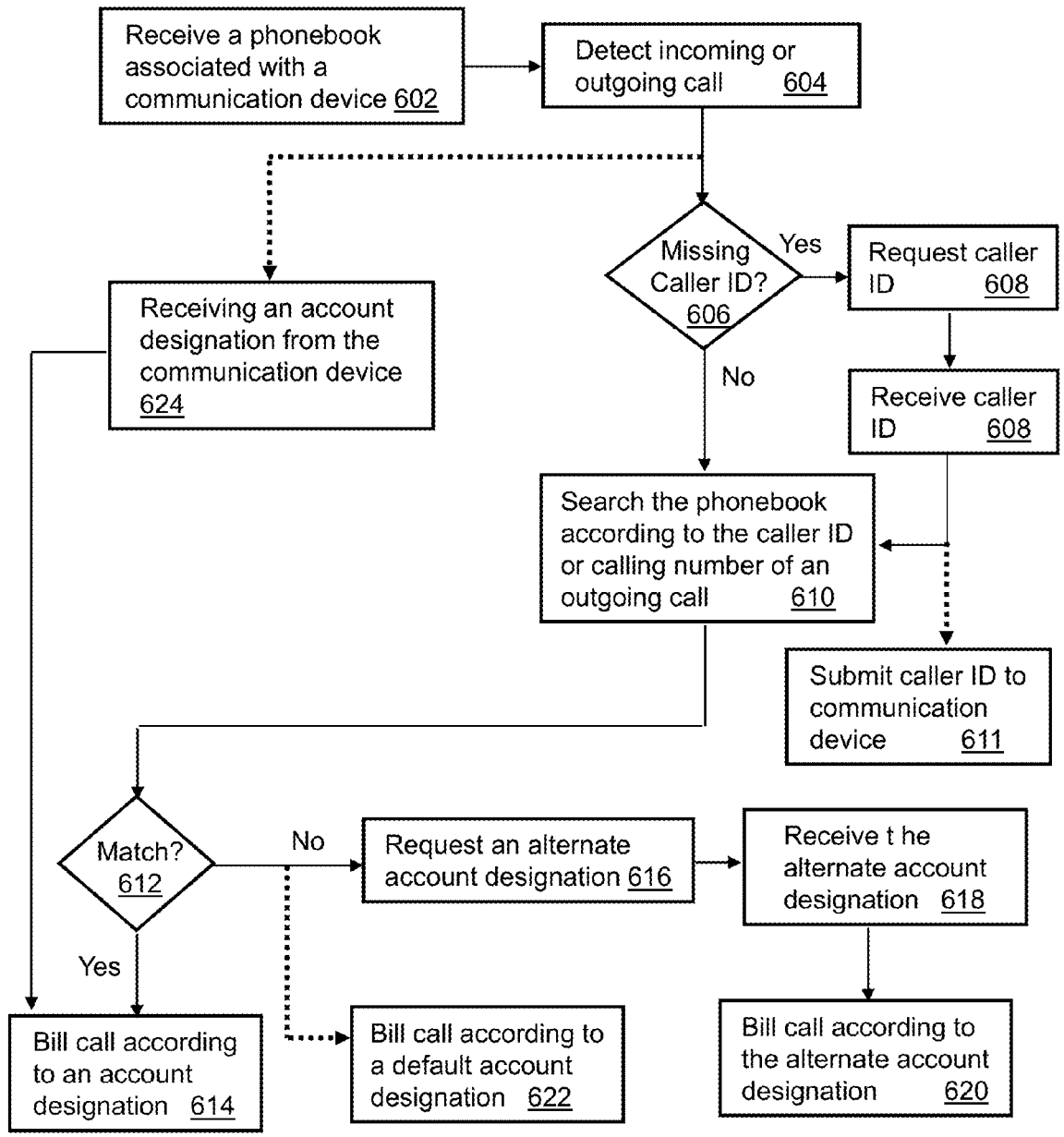
FIG. 6 depicts an exemplary method operating in the NMS.

FIG. 6 depicts an exemplary method 600 operating in the NMS 110. The NMS 110 can comprise a controller and a transceiver much like those shown in FIG. 2. The transceiver can support common wired or wireless communication technologies coupled to the base station 104 and the WiFi and/or Bluetooth access points 105 for monitoring operations thereof. The controller can be a computing device such as a server with associated volatile and non-volatile mass storage memories.

In a first embodiment, the NMS 110 can be programmed in step 602 to receive a phonebook associated with the communication device 102. In step 604, the NMS 110 can be programmed to detect an incoming or outgoing call from one among the base station 104 or access points 105 shown in FIG. 1. If the NMS 110 detects in step 606 an incoming call with a missing caller ID (e.g., a private caller), the NMS 110 proceeds to step 608 where it can be programmed to request a caller ID from the calling party. This step can represent an interactive voice response (IVR) application operating in the controller of the NMS 110.

An IVR application can be used in this step to request by way of recorded or synthesized speech the calling party's caller ID. The NMS 110 can receive in step 608 the caller ID by way of DTMF (Dual Tone Multi-Frequency) tones or speech of the calling party which can be processed by the IVR into a caller ID. The NMS 110 can proceed to step 610 where it searches the phonebook according to the caller ID of the incoming call. For outgoing calls, the phonebook can be searched in step 610 according to the calling number of the outgoing call initiated by the communication device 102.

If a phonebook entry match is found in step 612, the NMS 110 proceeds to step 614 where it bills the incoming or outgoing call according to an account designation corresponding to the identified phonebook entry. If, on the other hand, a match is not found, the NMS 110 proceeds to one of steps 616 and 622. In step 616, the NMS 110 can be programmed to request from the end user of the communication device 102 an alternate account designation for the incoming or outgoing call. The request can take place before, during or after the call transaction occurs.

The request can be presented by way of a prompt transmitted on a data channel of the communication device 102 (e.g., GPRS, or IP channel) that connects to the NMS 110. The prompt requesting the alternate account designation can be conveyed over the display 210 showing the caller ID for the incoming call, or calling number for the outgoing call. In step 618, the NMS 110 can be programmed to receive the alternate account designation as response information corresponding to entries made by the end user with the keypad 208 transmitted over the data channel. Once received, the NMS 110 can proceed to step 620 to bill the call transaction (i.e., incoming or outgoing call) according to the alternate account designation provided by the end user. Alternatively, the NMS 110 can proceed to step 622 where it bills the call according to a default account designation. As before, the advantage of an end user submitting the account designation is that it provides for a more accurate billing segregation technique.

The aforementioned steps of method 600 describe an embodiment whereby most of the account designation processing takes place in the NMS 110. In an embodiment where most of the account designation processing takes place in the communication device 102, the NMS 110 can proceed from step 604 to step 624 in which it receives an account designation from the communication device 102. In step 614, the NMS 110 bills the incoming or outgoing call according to the account designation provided by the communication device 102 once the call is accepted or initiated by the end user.

The foregoing methods 300-400 provide a means in a multimode communication device such as described above and illustrated in FIGS. 1-2 for segregating inbound or outbound calls transacted between the communication device 102 and the base station 104 or access points 105. By segregating billable calls, the end user can receive billing information from a service provider in a desirable format. Moreover, the NMS 110 can be programmed to submit portions of the billed calls to an employer's account thereby removing the burden from the employee to pay the calls and request reimbursement later, and saving the employer the cost of processing reimbursement requests. Segregated billing can also be used by the end user to bill clients for calls made to him or her.

Figure 7:
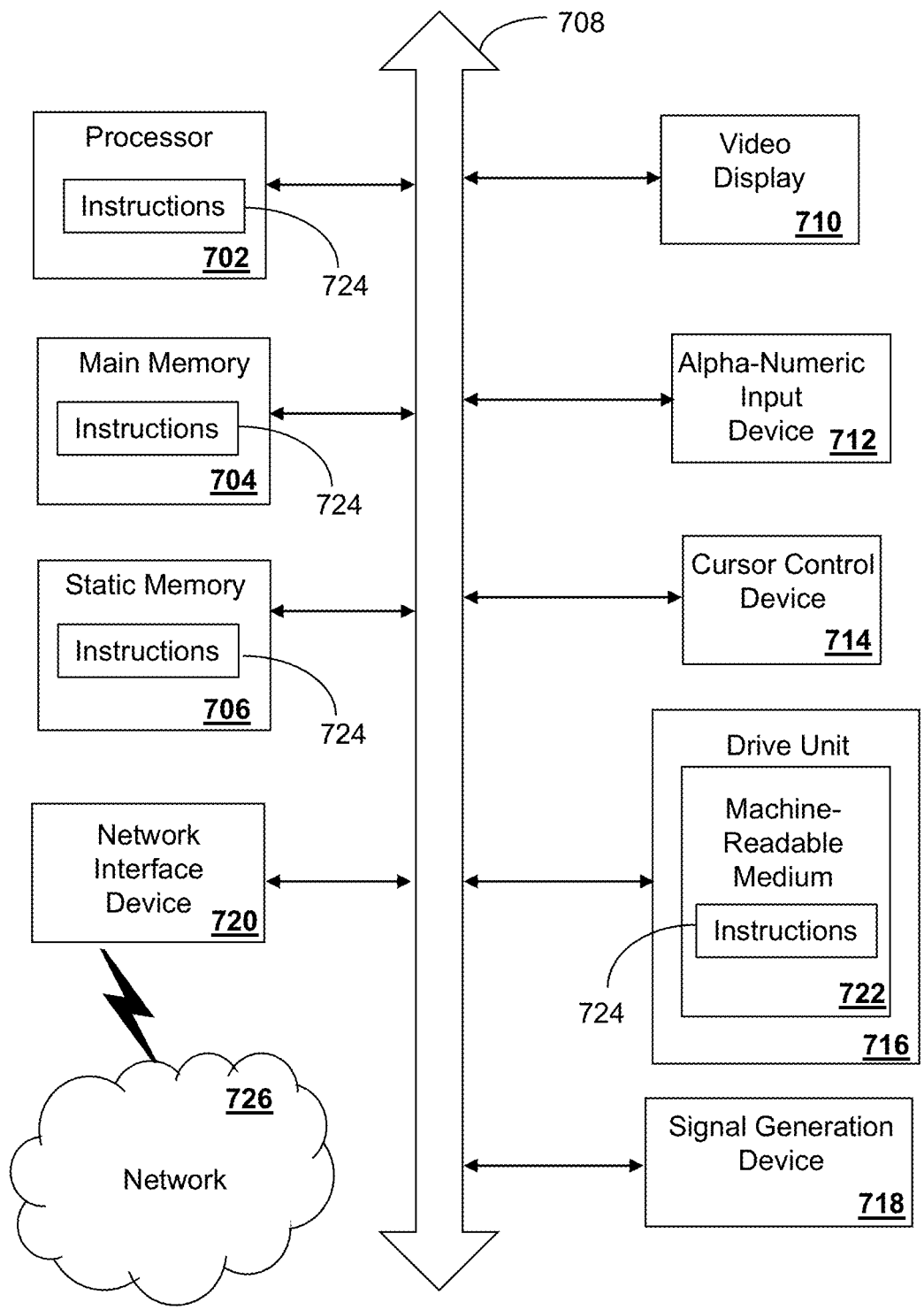
FIG. 7 depicts an exemplary diagrammatic representation of a machine in the form of a computer system within which a set of instructions, when executed, may cause the machine to perform any one or more of the methodologies disclosed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage device operating in a network management system server, wherein the storage device comprises instructions, which when executed by a processor, cause the processor to perform operations comprising:

detecting one of an incoming call having a caller ID directed to a communication device or a request for an outgoing call from the communication device on one of a plurality of access technologies operating in the communication device;

storing a phonebook associated with the communication device at the network management system server, wherein the phonebook is received from the communication device, wherein the phonebook comprises data presentable at the communication device to identify other communication devices and to allow the communication device to call the other communication devices;

for the incoming call, searching the phonebook associated with the communication device according to the caller ID, wherein each entry in the phonebook comprises a calling number and one of a plurality of account designations previously provisioned into the phonebook based on user input for identifying one of business calls or personal calls and wherein the plurality of account designations are previously provisioned into the entries of the phonebook is performed prior to the network management system server receiving the phonebook from the communication device;

if a match is detected between the caller ID and an entry in the phonebook, billing the incoming call once accepted by the communication device according to an account designation corresponding to the entry that is matched as determined by the network management system server without allowing user input of the account designation;

if no match is detected between the caller ID and entries in the phonebook, requesting an account designation from the communication device after the incoming call has been terminated;

receiving an alternate account designation from the communication device; and billing the incoming call once accepted by the communication device according to the alternate account designation;

for the outgoing call, searching the phonebook according to the request for the outgoing call;

if a match is detected between the request and an entry in the phonebook, billing the outgoing call once initiated according to an account designation corresponding to the entry that is matched as determined by the network management system server without allowing user input of the account designation;

if no match is detected between the request and entries in the phonebook, requesting an account designation from the communication device after the outgoing call has been terminated;

receiving an alternate account designation from the communication device; and billing the outgoing call once initiated by the communication device according to the alternate account designation, wherein the billing of the incoming or outgoing call is processed by the network management system independently of the communication device when a match is detected, wherein the account designations are provisioned in the entries of the phonebook at a transmitting mobile device and wherein the user input for the account designations originates at a computing device other than the communication device.

2. The storage device of claim 1, wherein the data in the phonebook is based on information inputted at the communication device.

3. The storage device of claim 1 wherein the plurality of account designations comprise designations between different business accounts.

4. The storage device of claim 1, comprising computer instructions which cause the processor to perform operations comprising adjusting the billing of the incoming call or the outgoing call according to the access technology utilized.

5. The storage device of claim 1, comprising computer instructions which cause the processor to perform operations comprising:
- detecting an incoming call without a caller ID;
- requesting from a calling party associated with the incoming call a caller ID;
- receiving from the calling party the caller ID; and
- forwarding the caller ID to the communication device.

6. The storage device of claim 1, wherein the plurality of account designations are cross-referenced to one of a billing account number or a billing address stored in the network management system server.

7. The storage device of claim 1, comprising instructions that cause the processor to perform operations comprising:
- receiving a phonebook update by way of a user interface from one of an end user, a personal digital assistant, or a computing device; and
- searching the phonebook update according to the caller ID.

8. The storage device of claim 1, further comprising instructions that cause the processor to perform operations comprising:
- receiving from the communication device a second phonebook comprising an additional account designation; and
- storing the second phonebook at the network management system.

9. A method comprising:
- detecting, by a system comprising a processor, one of an incoming call having a caller ID directed to a communication device or a request for an outgoing call from the communication device on one of a plurality of access technologies operating in the communication device;
- storing, by the system, a phonebook associated with the communication device at a network management system server associated with the communication device, wherein the phonebook is received from the communication device, wherein the phonebook comprises data presentable at the communication device to identify other communication devices and to allow the communication device to call the other communication devices;
- for the incoming call,
- using, by the system, the network management system server to determine a match between an entry in the phonebook and the caller ID;
- using, by the system, the network management system server to generate an account designation based on the match, the account designation being previously provisioned into the phonebook based on user input and wherein the provisioning of the account designation in the phonebook is performed prior to the network management system server receiving the phonebook from the communication device;
- billing, by the system, the incoming call once accepted by the communication device according to the account designation and the access technology without allowing user input of the account designation;
- for the outgoing call,
- using, by the system, the network management system server to determine a match between an entry in the phonebook and the request for the outgoing call; and
- billing, by the system, the outgoing call once initiated according to the account designation and the access technology without allowing user input of the account designation, wherein the billing of the incoming or outgoing call is processed by the network management system independently of the communication device, wherein the account designations are provisioned in the entries of the phonebook at a transmitting mobile device and wherein the user input for the account designations originates at a computing device other than the communication device.

10. The method of claim 9, wherein the caller ID comprises one of a circuit-switched ID or a packet-switched ID.

11. The method of claim 9, wherein the incoming calls and the outgoing calls comprise one of voice services or data services.

12. The method of claim 9, comprising submitting, by the system, to the network management system a default account designation in response to an acceptance of the call by the user if no match is detected between the caller ID and entries in the phonebook.

13. The method of claim 12, comprising:
- receiving, by the system, the default account designation from the user by way of a user interface; and
- storing, by the system, the default account designation.

14. The method of claim 9, comprising:
- if no match is detected between the caller ID and entries in the phonebook,
- requesting, by the system, an alternate account designation from the user;
- receiving, by the system, the alternate account designation by way of a user interface; and
- submitting, by the system, to the network management system the alternate account designation in response to an acceptance of the call by the user.

15. The method of claim 9, wherein the plurality of access technologies are operable to support two communication technologies comprising software defined radio communications operating in unused television spectrum, cellular communications, Bluetooth communications, WiFi communications, WiMAX communications, ultra wideband communications, or combinations thereof.

16. The method of claim 9, comprising:
- establishing, by the system, a service preference from a group of preference criteria comprising cost of service, quality of service, RF signal strength of a base station, communication range of the base station relative to a location of a multimode communication device, and hand-off capabilities of neighboring base stations.

17. The method of claim 16, wherein the service preference is grouped according to an end user profile comprising one of a stationary end user profile, a mobile end user profile, an economic end user profile, a data centric end user profile, or a combination thereof.

18. A device, comprising:
- a memory to store instructions; and
- a processor coupled to the memory, wherein the processor, responsive to executing the instructions, performs operations comprising:
- detecting one of an incoming call having a caller ID directed to a communication device or a request for an outgoing call from the communication device on one of a plurality of access technologies operating in the communication device;
- storing a phonebook associated with the communication device at a network management system server, wherein the phonebook is received from the communication device, wherein the phonebook comprises data presentable at the communication device to identify other communication devices and to allow the communication device to call the other communication devices;
- for the incoming call,
- searching the phonebook associated with the communication device according to the caller ID, wherein each entry in the phonebook comprises a calling number and one of a plurality of account designations previously provisioned into the phonebook based on user input for identifying one of business calls or personal calls and wherein the provisioning of the plurality of account designations in the entries of the phonebook is performed prior to the network management system server receiving the phonebook from the communication device;

if a match is detected between the caller ID and an entry in the phonebook, billing the incoming call once accepted by the communication device according to an account designation corresponding to the entry that is matched as determined by the network management system server without allowing user input of the account designation;

if no match is detected between the caller ID and entries in the phonebook, requesting an account designation from the communication device after the incoming call has been terminated;

receiving an alternate account designation from the communication device; and billing the incoming call once accepted by the communication device according to the alternate account designation;

for the outgoing call, searching the phonebook according to the request for the outgoing call;

if a match is detected between the request and an entry in the phonebook, billing the outgoing call once initiated according to an account designation corresponding to the entry that is matched as determined by the network management system server without allowing user input of the account designation;

if no match is detected between the request and entries in the phonebook, requesting an account designation from the communication device after the outgoing call has been terminated;

receiving an alternate account designation from the communication device; and billing the outgoing call once initiated by the communication device according to the alternate account designation, wherein the billing of the incoming or outgoing call is processed by the network management system independently of the communication device when a match is detected, wherein the account designations are provisioned in the entries of the phonebook at a transmitting mobile device and wherein the user input for the account designations originates at a computing device other than the communication device.

19. The device of claim 18, wherein the processor further performs operations comprising:

detecting an incoming call without a caller ID;

requesting from a calling party associated with the incoming call a caller ID;

receiving from the calling party the caller ID; and forwarding the caller ID to the communication device.

20. The device of claim 18, wherein the account designations are cross-referenced to one of a billing account number or a billing address stored in the network management system server.

* * * * *